(12) United States Patent
Kubo (10) Patent No.: US 7,945,357 B2
(45) Date of Patent: May 17, 2011

(54) MOVABLE BODY SYSTEM HAVING LINEAR MOTOR

(75) Inventor: Hideki Kubo, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 0 days.

(21) Appl. No.: 12/363,390

(22) Filed: Jan. 30, 2009

(65) Prior Publication Data

US 2009/0198394 A1 Aug. 6, 2009

(30) Foreign Application Priority Data

Feb. 6, 2008 (JP) ................................ 2008-025935

(51) Int. Cl.
*G05D 1/00* (2006.01)
*G01C 21/32* (2006.01)
*G01R 31/20* (2006.01)
*B60L 15/00* (2006.01)

(52) U.S. Cl. .......... 701/19; 701/200; 701/210; 701/245; 324/754; 324/758; 310/12.19; 310/12.06; 310/58; 104/295; 104/88.04

(58) Field of Classification Search ................... 701/210, 701/245, 200; 324/754, 758; 310/12.19, 310/12.06, 58; 104/295, 88.04
See application file for complete search history.

(56) References Cited

U.S. PATENT DOCUMENTS

| | | | |
|---|---|---|---|
| 5,801,462 A * | 9/1998 | Yagoto et al. ............... 310/12.19 |
| 6,275,815 B1 * | 8/2001 | Schaffer et al. ................. 706/13 |
| 6,283,039 B1 * | 9/2001 | Takayanagi et al. .......... 104/295 |
| 6,573,623 B2 * | 6/2003 | Tsuboi et al. ............... 310/12.19 |
| 6,590,355 B1 * | 7/2003 | Kikuchi et al. ............. 310/12.06 |
| 7,343,995 B2 * | 3/2008 | Fukuhara et al. ............. 180/168 |
| 7,577,517 B2 * | 8/2009 | Nagasawa ..................... 701/200 |
| 7,600,478 B2 * | 10/2009 | Shimamura et al. ....... 104/88.04 |
| 2003/0136086 A1 * | 7/2003 | Kalany et al. ................... 53/443 |
| 2004/0148763 A1 * | 8/2004 | Peacock et al. ................. 29/739 |
| 2006/0001390 A1 * | 1/2006 | Yamazaki et al. ............ 318/135 |
| 2006/0220478 A1 * | 10/2006 | Emoto ............................ 310/58 |
| 2006/0289605 A1 * | 12/2006 | Park et al. ...................... 228/4.5 |
| 2007/0027615 A1 * | 2/2007 | Nagasawa ..................... 701/200 |
| 2007/0027651 A1 * | 2/2007 | Ng et al. ....................... 702/116 |
| 2007/0069117 A1 * | 3/2007 | Sakagami et al. ........ 250/231.13 |

FOREIGN PATENT DOCUMENTS

| | | |
|---|---|---|
| JP | 2002-337037 | 11/2002 |
| JP | 2005-143171 | 6/2005 |

OTHER PUBLICATIONS

JPO2002/337037—English Translation.*
JPO2005/143171—English Translation.*
JP 2005-143171 Translate.*

* cited by examiner

*Primary Examiner* — Khoi Tran
*Assistant Examiner* — Ian Jen
(74) *Attorney, Agent, or Firm* — DLA Piper LLP (US)

(57) ABSTRACT

Primary coils of a linear motor are arranged along a travel route. A movable body has a secondary side of the linear motor. The travel route is divided into a plurality of zones, and a zone controller is provided for each zone or controlling the coils of the linear motor in the zone. A coordinate of the movable body outputted from a linear scale of the coil is converted into a coordinate based on the travel route.

4 Claims, 6 Drawing Sheets

| Route ID | Type | Route length |
|---|---|---|
| Connection origin route ID | | Connection coordinate (origin, destination) |
| ⋮ | | |
| Connection destination route ID | | Connection coordinate (origin, destination) |
| ⋮ | | |

MOVABLE BODY SYSTEM HAVING LINEAR MOTOR

TECHNICAL FIELD

The present invention relates to a movable body system using a linear motor. In particular, the present invention relates a technique of determining a coordinate of a movable body relative to a travel route.

BACKGROUND ART

In a known system, for transportation of articles in a clean room or the like, movable bodies are moved using a linear motor having a primary side on the ground, and a secondary side on each of the movable bodies. For example, as the linear motor, an LSM (linear synchronous motor) is adopted. Coils are provided on the ground, and secondary members such as magnets and magnetizable material are provided on the movable bodies. In a large-scale system having a long travel route, loops and transits between the loops are provided. Therefore, the travel route is divided into a plurality of zones, and the linear motor is controlled by a zone controller provided for each zone.

Using linear scales or the like provided on the primary coils of the linear motor, coordinates of the movable bodies based on the linear scales are recognized. However, a technique of determining coordinates of movable bodies relative to the travel route by interconnection of the coordinates of the movable bodies is not known. In this approach, the zone controller controls positions of movable bodies using coordinates based on individual linear scales. Therefore, it is difficult to place a plurality of movable bodies in one zone. It is because positions of the movable bodies are not controlled based on positions on the travel route, but controlled based on positions relative to the coils, and it is difficult to control distances or the like between the movable bodies.

The number of movable bodies per zone represents transportation capability of the system. In this regard, in an attempt to improve the transportation capability, the inventor studied to make it possible to express the position of the movable body in a coordinate system for directly expressing the position on the travel route, without using the coordinate based on the linear scale. As an example of a related art document, Patent Publication 1 (JP2002-337037A) proposes a technique of detecting a position of a movable body using a linear scale.

DISCLOSURE OF THE INVENTION

Problems to be solved by the Invention

An object of the invention is to allow a plurality of movable bodies to travel in each zone by detecting coordinates of the movable bodies on a travel route using the existing sensor.

Means for Solving the Problems

The present invention relate to a movable body system including primary coils of a linear motor arranged along a travel route, and a movable body having a secondary side of the linear motor.

The travel route is divided into a plurality of zones. Each of the zones has a zone controller for controlling the coils in the zone. Each of the coils has a linear scale. The zone controller has coordinate calculation means for converting a coordinate of the movable body based on the linear scale outputted from the linear scale, into a coordinate based on the travel route.

Preferably, means for determining a distance between movable bodies by means of the coordinate based on the travel route determined by the coordinate calculation means is provided for allowing a plurality of movable bodies to travel in one zone.

More preferably, the movable body has an ID, and at least one ID reader is provided in each zone for reading the ID of the movable body in the zone.

Particularly preferably, the coordinate based on the travel route includes an ID of a sub-route as a part of the travel route, and a coordinate in the sub-route.

Further, according to the present invention, a method of controlling a movable body system includes the steps of:

arranging primary coils of a linear motor along a travel route, the primary coils each having a linear scale;

providing a movable body on the travel route, the movable body having a secondary side of the linear motor;

dividing the travel route into a plurality of zones, and providing a zone controller for controlling the coils of the linear motor in each zone;

converting a coordinate of the movable body based on the linear scale outputted from the linear scale, into a coordinate based on the travel route; and controlling the coils of the linear motor by the zone controller, by means of the coordinate based on the travel route.

In the specification, description regarding the movable body system is directly applicable to the method of controlling the movable body system.

Advantages of the Invention

In the present invention, a coordinate based on a linear scale is converted into a coordinate based on a travel route to determine a position of a movable body objectively. In this manner, a distance between movable bodies can be determined, and a plurality of movable bodies can travel in one zone.

By reading an ID of the movable body in a zone using an ID reader, if any movable body enters a new zone, entry of the movable body can be identified, and movement of the movable body can be tracked easily. Further, at the time of restoration from blackout or the like, correspondence between positions of movable bodies and zones can be confirmed. Therefore, the system can be restored without requiring an operator to move around the travel route for checking positions of movable bodies.

Further, by expressing a coordinate of the movable body based on the travel route using an ID of a sub-route and a coordinate in the sub-route, the position of the movable body can be expressed uniquely. Further, by referring to data indicating a connection relationship between sub-routes, a travel distance to a destination can be determined easily.

Figure 1:
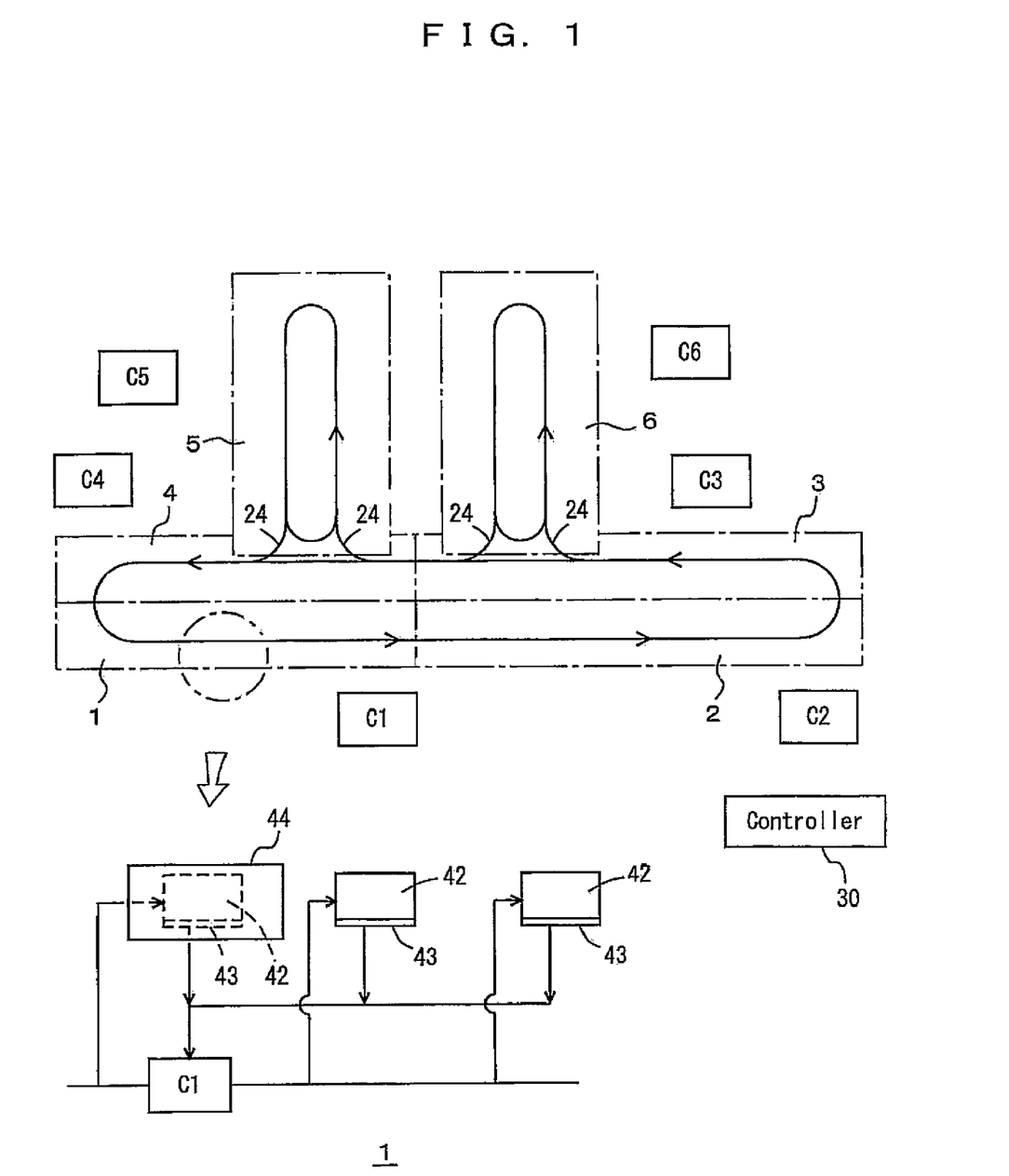
FIG. 1 is a plan view showing main components of a movable body system according an embodiment.

DESCRIPTION OF THE NUMERALS 1 to 15: zone
20, 21: main loop
22: intra-bay loop
24: transit line
26: shortcut
30: controller
32: bus
40: power line
41: signal line
42: coil
43: linear scale
44: movable body
45: magnet
46: ID
47: magnetic pole sensor
50: transfer apparatus
51: absolute coordinate calculation unit
52: target speed setting unit
53: motor control unit
54: transfer control unit
55: diverge control unit
56: communication unit
60 to 62: absolute coordinate data
64: route table
C1 to C15: zone controller
I1 to I48: ID reader
D1 to D4: diverge apparatus
M1 to M3: merge apparatus Embodiment FIGS. 1 to 7 show a movable body system according to an embodiment. FIG. 1 shows a basic concept of the embodiment. A travel route is divided into a plurality of zones 1 to 6. Among the zone 1 to 6, the zones 1 to 4 are inter-bay routes, and the zones 5 and 6 are intra-bay routes. The inter-bay route is a main or parent sub-route, and the intra-bay route is a branch or child sub-route. Basically, each of the sub-routes is formed in a loop, and the routes are interconnected by transit lines 24.

Zone controllers C1 to C6 are provided for the respective zones, and the zone controllers C1 to C6 are controlled by a controller 30 that controls the entire system. Part of the travel route of the zone 1 is enlarged on a lower side in FIG. 1. For example, primary coils 42 of a linear motor are arranged at a predetermined pitch along the travel route. Movable bodies 44 each having a linear motor secondary magnet moves along the travel route. Each coil 42 has a linear scale 43. By magnetically detecting the magnet 45 of the movable body 44, or by reading an optical scale provided in the movable body 44, a coordinate of the movable body 44 based on the installation position of the linear scale 43 is outputted.

The controller C1 or the like stores an offset of the coils 42 in each travel route in the coordinate system in units of sub-routes, and adds the offset and a coordinate from the linear scale to determine the coordinate in the sub-route. In the manner, as described above, the zone controller C1 or the like determines the position of the movable body in the sub-route, converts it into an absolute coordinate with additional information such as an ID and a type of the sub-route, and outputs the absolute position to nearby zone controllers and the controller 30. Preferably, the arrangement pitch of the coils 42 is shorter than a measurement span determined by combination of the movable body 44 and the linear scale 43 so that the coordinate of the movable body 44 can be measured seamlessly without any gap.

Figure 2:
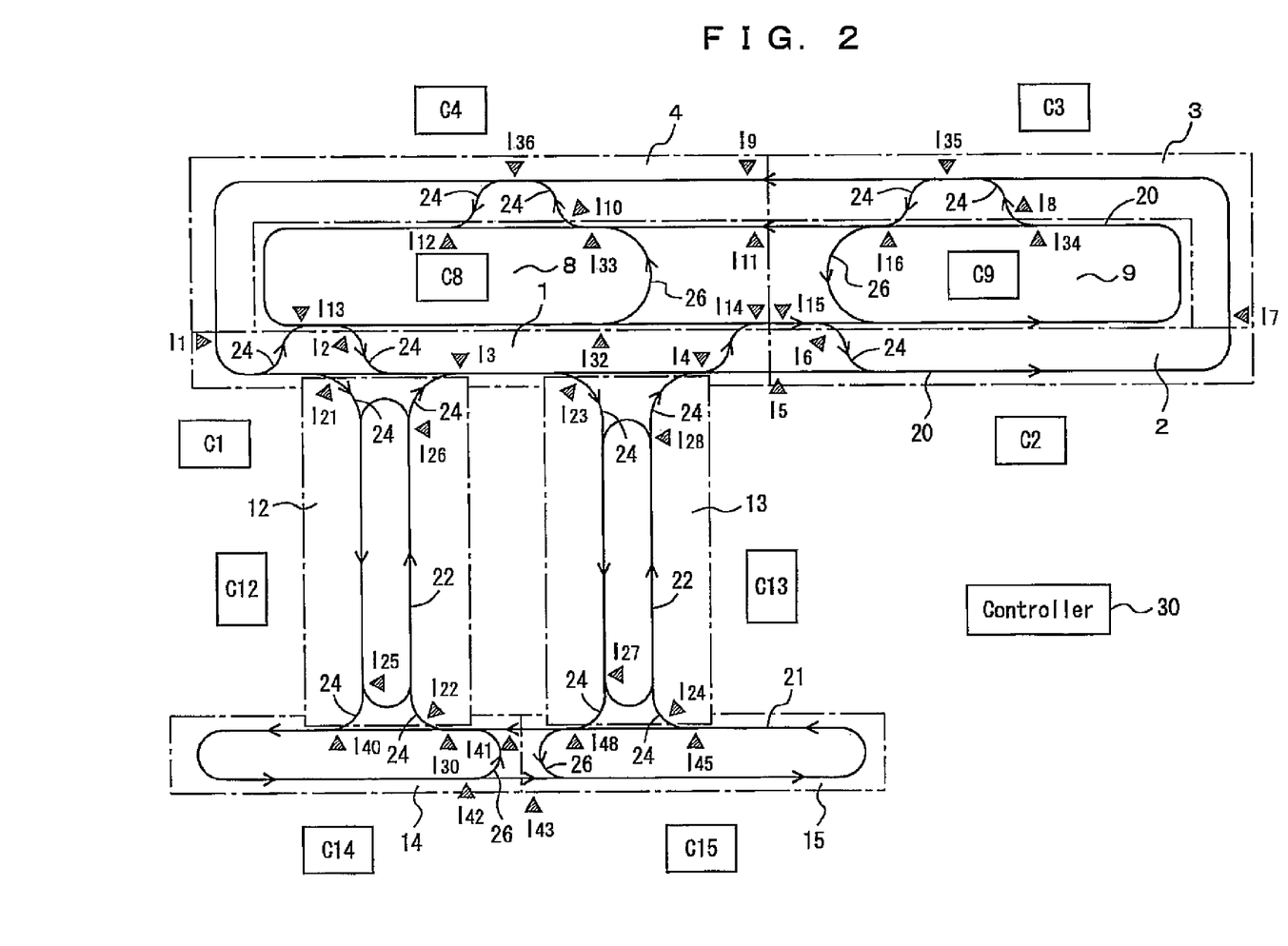
FIG. 2 is a plan view showing a layout of a movable body system according to the embodiment.

FIG. 2 shows a layout of the movable body system. The constituent components that are identical to those shown in FIG. 1 are labeled with the same reference numerals. Zones 1 to 4, and zone 8 and 9 form a main loop 20 having two traffic lanes. Further, zones 14 and 15 form a main loop 21 having one traffic lane. Zones 12 and 13 form intra-bay routes 22. Dot-dash lines in the drawing denote boundaries between zones. Reference numerals 24 denote transit lines connecting the intra-bay routes 22 to the main loops 20, 21. Further, traffic lanes are connected by the main loop 20 having the two traffic lanes. Reference numerals 26 denote shortcuts for allowing travel along the loops 20, 21 in a short period of time.

The controllers C1 to C15 control associated zones. At least one of the ID reader I1 to I48 is provided in each zone to read IDs of movable bodies. In the embodiment the ID readers I1 to I45 are provided at entrances of the zones and at positions upstream of diverge segments. Alternatively, the ID readers I1 to I45 may be provided for each of coils of the linear motor. Arrows in FIG. 2 show travel directions of the movable bodies.

Figure 3:
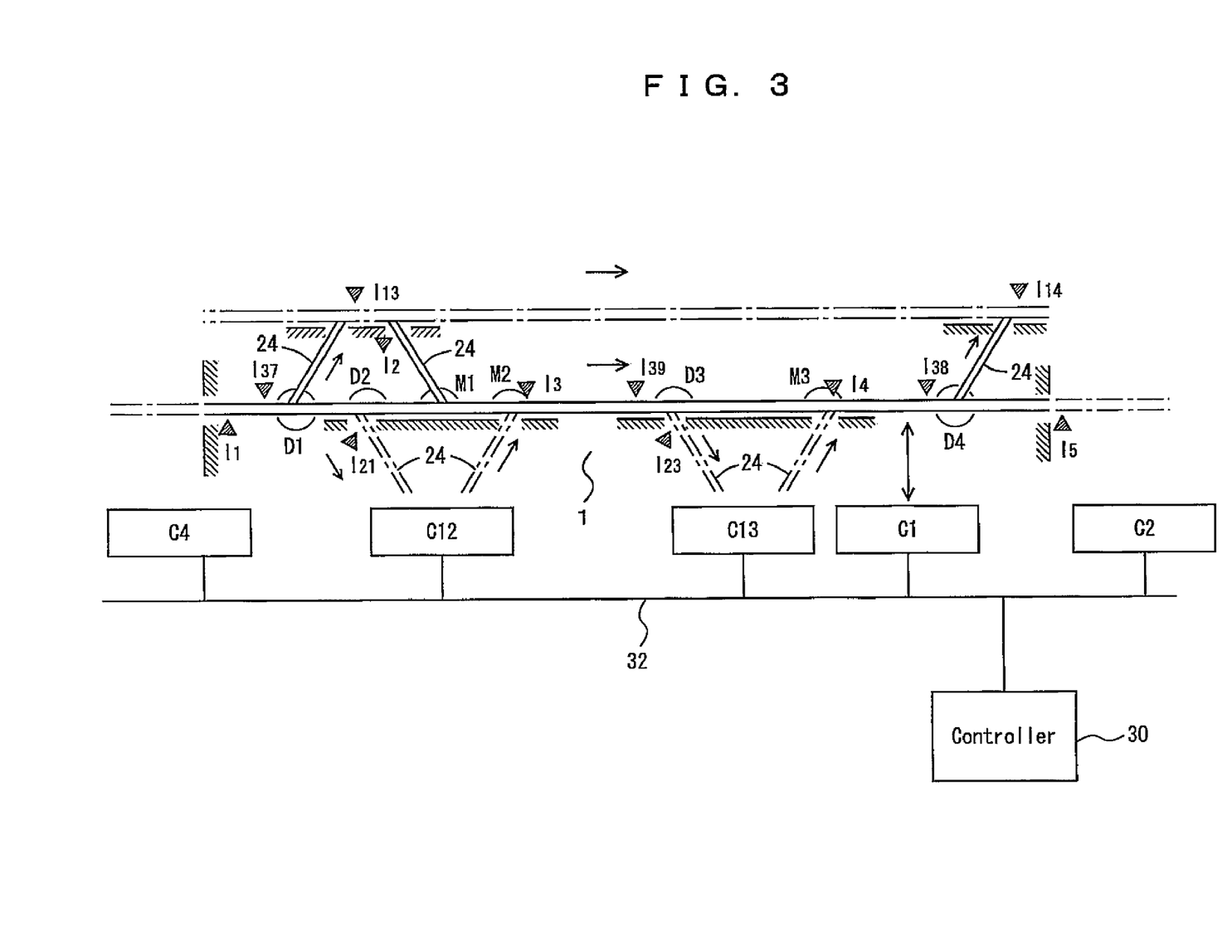
FIG. 3 is a diagram schematically showing a control range of a zone controller in the embodiment.

FIG. 3 shows a layout of ID readers and transit lines 24 in the zone 1 as an example. The ID readers are provided at the entrances of the zones and at positions before the diverge segments. In the layout, when a movable body enters the zone 1, an ID of the movable body can be read by the ID reader. Further, the ID can be read at the position before the diverge segment for controlling the movable body to move straight or move into the diverge segment. In the embodiment, a mechanical mechanism controls the movable body to move into a diverge segment or a merge segment. Alternatively, the linear motor may control the movable body to move into the diverge segment or the merge segment. Reference numerals D1 to D4 denote diverge apparatuses, and reference numerals M1 to M3 denote merge apparatuses provided at respective diverge segments and merge segments in FIG. 2.

A reference numeral 32 denotes a bus for connecting the controller 30 and the zone controller C1 or the like. The controller 30 or the like sends transportation instructions to the zone controller C1 or the like, and the zone controller C1 or the like reports the current position and the speed of the movable body at the absolute coordinate to the controller 30. Further, the zone controller C1 or the like notifies the limit speed at the zone boundary to the zone controller on the upstream side. Based on the limit speed at the zone boundary, the zone controller on the upstream side restricts the speed of the movable body.

Figure 4:
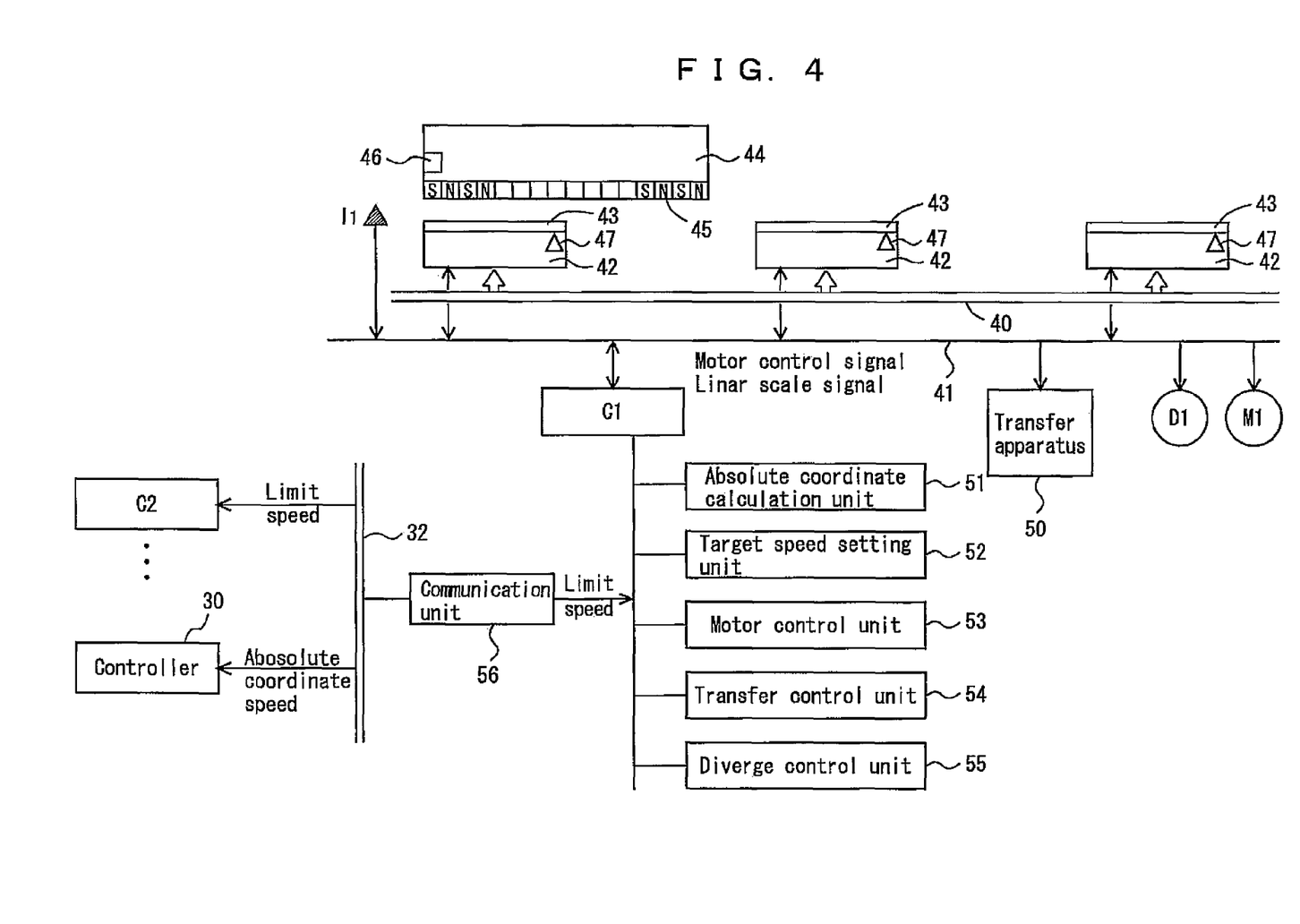
FIG. 4 is a diagram showing structure of the zone controller in the embodiment.

FIG. 4 shows a layout of the linear scales 43 and structure of the zone controller. The movable body 44 has a magnet 45 such as a permanent magnet, and travels synchronously with the traveling magnetic field from the coils 42. The gravity is supported by wheels (not shown) or the like. The linear scale 43 and the magnetic pole sensor 47 are formed integrally with, e.g., the coils 42, and the number of magnetic poles of the magnet 45 is counted by the magnetic pole sensor 47. The linear scale 43 detects the phase or the like of the magnet 45 relative to the linear scale 43, and combines the detected data with a signal from the magnetic pole sensor 47 to determine the position of the magnetic object 44 based on the linear scale 43. The movable body 44 has an ID 46 such as an RFID or a barcode, and the ID 46 is read by an ID reader I1 or the like. A reference numeral 40 denotes a power line, and a reference numeral 41 denotes a signal line. The zone controller C1 or the like controls the coils 42 through the signal line 41, and receives data from the linear scales 43 and the ID reader. The coils 42 are energized through the power line 40. Further, the zone controller C1 or the like controls a transfer apparatus 50 or the like provided in a station, and controls the diverge apparatus D1, and the merge apparatus M1 or the like.

Each of the zone controllers such as the zone controller C1 has an absolute coordinate calculation unit 51. The signal from the linear scale 43 includes an ID of the coil 42. The absolute coordinate calculation unit 51 has a table for converting the ID of the coil to an ID of a sub-route to which the coil belongs, and an offset based on the origin of the sub-route. By adding the offset to the coordinate from the linear scale 43, and adding data such as the ID and the type of the sub-route to which the linear scale belongs, an absolute coordinate for uniquely identifying the position of the movable body 44 over the entire travel route is obtained. For example, the types of the travel route include a large-scale main loop, a medium-scale main loop, an intra-bay route, and a transit line.

A target speed setting unit 52 sets a target speed of the movable body 44. An upper limit of the travel speed is defined for each segment having a size corresponding to, e.g., a pitch of arranging the coils 42. Then, by the distance between the movable bodies 44, a limit speed for preventing interference is determined. The speed at which a trailing movable body can avoid interference even if a leading movable body is decelerated at the maximum deceleration is determined as the limit speed. Further, each of the zone controllers notifies the limit speed at the zone boundary to the zone controller on the upstream side. The upper limit speed at the zone boundary is the maximum speed for entry of the movable body from the zone on the upstream side without any interference with the movable body 44 in the zone on the downstream side, and for allowing the movable body to pass through the exit of the zone on the downstream side within a limit speed range. Upon receiving a notification of the limit speed at the zone boundary, the zone controller on the upstream side takes the limit speed at the zone boundary into consideration, instead of taking the position and speed of the movable body in the zone on the downstream side into consideration. Thus, the process in the zone controller on the upstream side can be carried out easily.

The motor control unit 53 controls the coils 42 as primary coils of the linear motor. The transfer control unit 54 controls operation of the transfer apparatus 50 relative to the movable body 44 stopped at a station, and controls operation of the transfer apparatus 50. A divergence control unit 55 controls the diverge apparatus D1, the merge apparatus M1 or the like to control diverging and merging of the movable bodies 44.

The zone controller C1 or the like has a communication unit 56 for communicating with the other zone controller C2 or the like, and the controller 30 through the bus 32. Communication between the zone controllers include notification of the limit speed to the zone controller on the upstream side, and notification of data such as an ID and a destination of the entered movable body. In the case of communication between the controller 30 and zone controller C1 or the like, the absolute coordinate and the speed of the movable body are notified from the zone controller C1 or the like to the controller 30. The controller 30 notifies the ID of the movable body and the travel instruction to the zone controller C1 or the like. The travel instruction includes a list of IDs of movable bodies, destinations, and sub-routes leading to the destinations.

Figure 5:
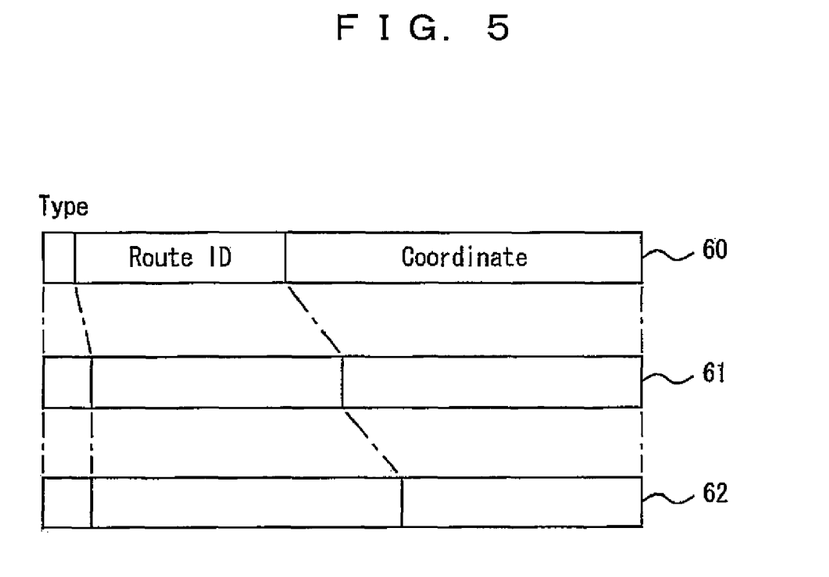
FIG. 5 is a diagram showing data structure of an absolute coordinate in the embodiment.

FIG. 5 shows absolute coordinate data 60 to 62. The data 60 is data for the large-scale main loop. As a type, for example, "0" is assigned to the first one bit, and an ID of a route and a coordinate in the route are described in the data 60. Data 61 is used for the medium-scale main loop. For example, the type of the data 61 is expressed by "10" in two bits, and an ID of a route and a coordinate of the route is described in the data 60. The data 62 is used for the intra-bay route and the transit line. The type of the data 62 is "11" in two bits, and an ID of a route and a coordinate in the route are described in the data 62. The data 60 to 62 have a common data length. Further, in the same sub-route, if the current position is determined, the distance to a forward position can be determined. If the entire length of the route is determined, the distance or interval to a backward position is the same route can be determined.

Figure 6:
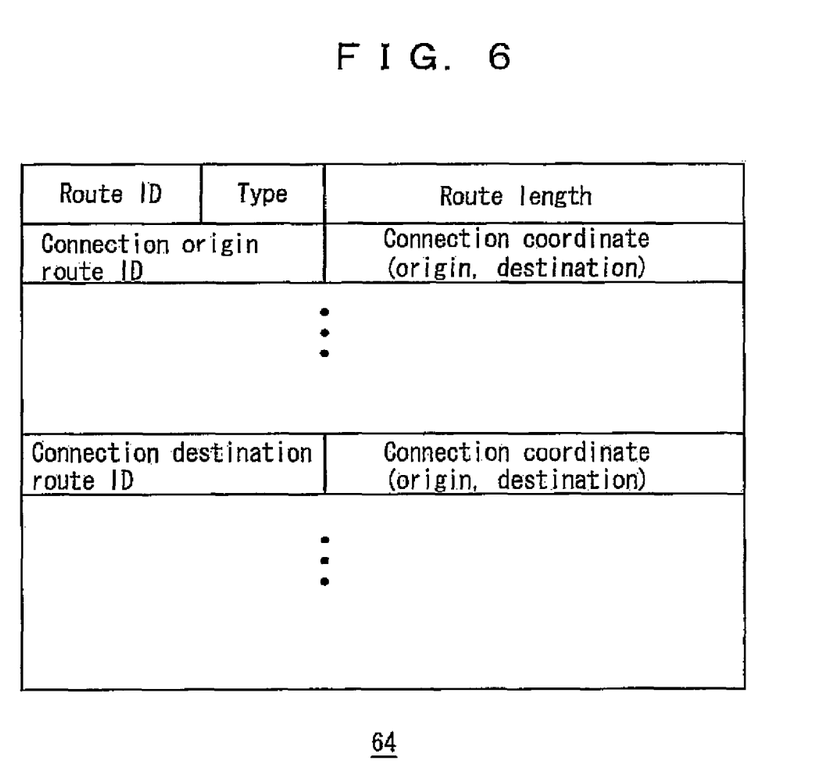
FIG. 6 is a diagram showing data in a route table for one route in the embodiment.

A reference numeral 64 denotes a route table. For example, data of the route table 4 may be stored in the controller 30, and additionally in the zone controllers C1 to C15. FIG. 6 shows data in the route table 64 for one sub-route. FIG. 6 shows the ID and the type of the route, and the entire length of the route. One sub-route includes one or more connection origin routes and connection destination routes. The connection origin means the upstream side, and the connection destination means the downstream side. For each of the connection origin routes and the connection destination routes, the ID of the route, and both of the connection origin coordinate and the connection destination coordinate are described as the coordinate of the connection position. In this manner, arbitral positions on the entire travel route, and distances between arbitral positions can be determined.

Figure 7:
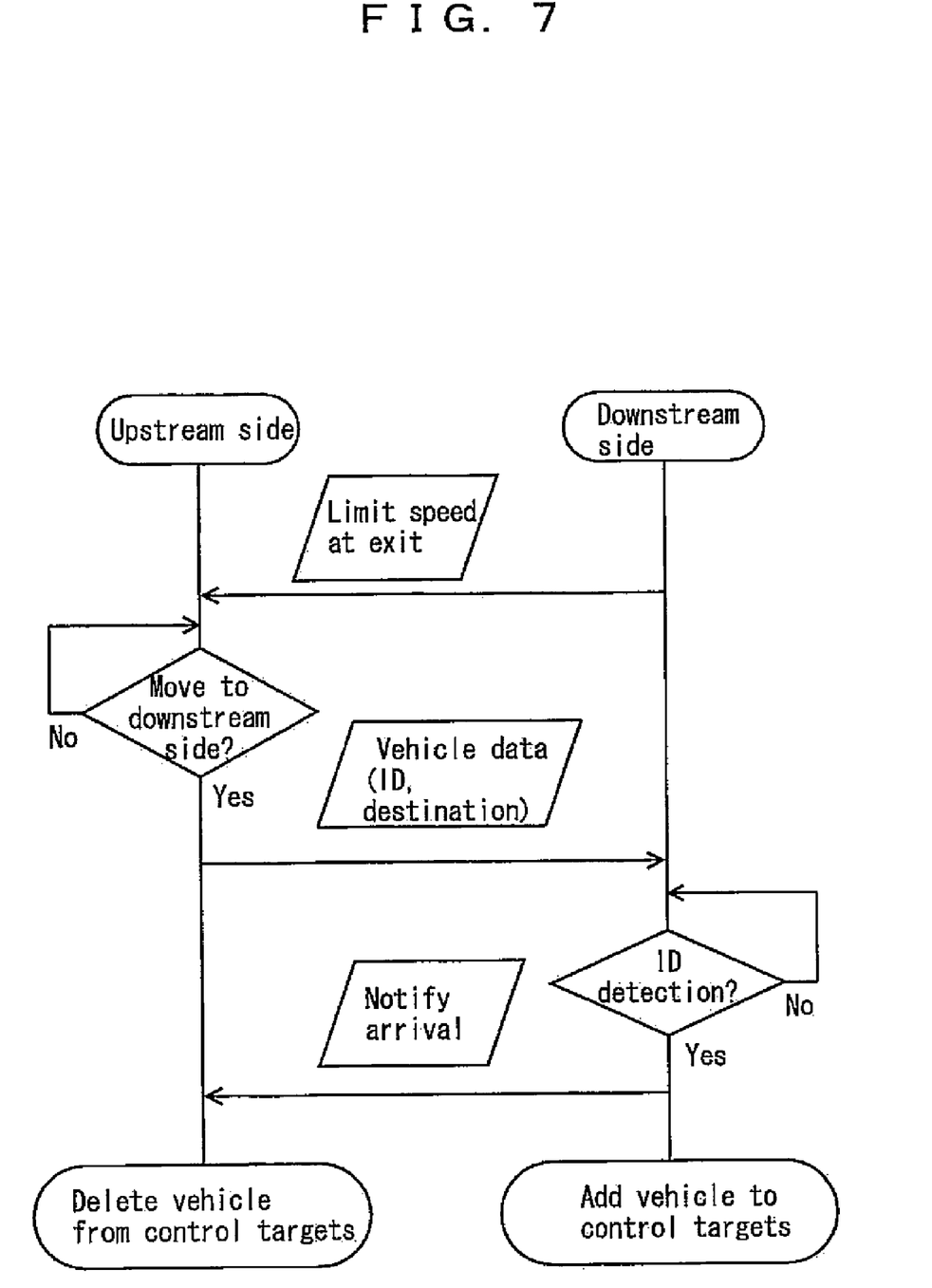
FIG. 7 is a diagram showing control at the time when a movable body passes through a boundary between zone controllers in the embodiment.

FIG. 7 shows an algorithm at the time when the movable body moves from a zone on the upstream side to a zone on the downstream side. The zone controller on the upstream side notifies the limit speed at the zone boundary, e.g., at predetermined time interval. Thus, the zone controller on the upstream side restricts the speed of the movable body in order to prevent problems such as interference of with the leading movable body when the trailing movable body enters the zone on the downstream side. In the case where there is any movable body which is supposed to move to the zone on the downstream side, the ID and the destination of the movable body (list of routes leading to the destination) are notified from the zone controller on the upstream side to the zone controller on the downstream side. In this manner, the zone controller on the downstream side can carry out the process for preparation of the arrival of the movable body. When the ID of the movable body is detected by the ID reader at the entrance of the zone, the arrival of the movable body and the ID are notified to the zone controller on the upstream side. Thus, the movable body which has moved to the downstream side is deleted from targets controlled by the zone controller on the upstream side, and added to targets controlled by the zone controller on the downstream side.

Although the movable body for transportation of articles has been described in the embodiment, movable bodies of any types may be used. Further, types of the used linear motor are not limited to the linear synchronization motor.

In the embodiment, the following advantages are obtained.
(1) Using the coils of the linear scale, the position of the movable body in the entire travel route can be identified uniquely.
(2) Therefore, a plurality of movable bodies can travel easily in one zone, and improvement in the efficiency of the movable body system is achieved.
(3) Using an ID reader provided in the zone, tracking of which movable body passes which zone can be performed easily, and the process at the time where the movable body passes through the boundary between zones is performed easily. Further, at the time of restoration from blackout or the like, by allowing the movable body to travel in the zone at low speed, and detecting the ID of the movable body by the ID reader, the status of the system can be determined.
(4) The position of the movable body in the entire travel route can be identified uniquely based on the absolute coordinate.

The invention claimed is:

1. A movable body system including:
   primary coils of a linear motor arranged along a travel route; and
   a movable body having a secondary side of the linear motor,
   the travel route being divided into a plurality of zones, the zone each having a zone controller for controlling the coils in the zone,
   the coils each having a linear scale, the zone controller having coordinate calculation means for converting a coordinate of the movable body based on the linear scale outputted from the linear scale, into a coordinate based on the travel route;
   means for determining a distance between movable bodies based on the coordinate based on the travel route determined by the coordinate calculation means for allowing a plurality of movable bodies to travel in one zone.

2. The movable body system according to claim 1, the movable body having an ID, at least one ID reader being provided in each zone for reading the ID of the movable body in the zone.

3. The movable body system according to claim 2, the coordinate based on the travel route including an ID of a sub-route as a part of the travel route, and a coordinate in the sub-route.

4. A method of controlling a movable body system including the steps of:
   arranging primary coils of a linear motor along a travel route, the primary coils each having a linear scale;
   providing a movable body on the travel route, the movable body having a secondary side of the linear motor;
   dividing the travel route into a plurality of zones, and providing a zone controller for controlling the coils of the linear motor in each zone;
   converting a coordinate of the movable body based on the linear scale outputted from the linear scale, into a coordinate based on the travel route; and
   controlling the coils of the linear motor by the zone controller, by means of the coordinate based on the travel route;
   determining a distance between the movable bodies based on the coordinate based on the travel route determined by the converted coordinate for allowing a plurality of movable bodies to travel in one zone.

* * * * *